(12) United States Patent
Hou et al.

(10) Patent No.: US 11,977,947 B2
(45) Date of Patent: May 7, 2024

(54) ELECTRONIC SHELF LABEL COMMUNICATION SYSTEM, METHOD AND APPARATUS

(71) Applicant: Hanshow Technology Co., Ltd., Zhejiang (CN)

(72) Inventors: Shiguo Hou, Zhejiang (CN); Liangyan Li, Zhejiang (CN); Yunliang Feng, Zhejiang (CN); Bo Gao, Zhejiang (CN); Jun Chen, Zhejiang (CN); Qi Jiang, Zhejiang (CN); Ming Shen, Zhejiang (CN)

(73) Assignee: Hanshow Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/634,194

(22) PCT Filed: Aug. 9, 2019

(86) PCT No.: PCT/CN2019/099891
§ 371 (c)(1),
(2) Date: Mar. 14, 2022

(87) PCT Pub. No.: WO2021/026671
PCT Pub. Date: Feb. 18, 2021

(65) Prior Publication Data
US 2022/0292274 A1 Sep. 15, 2022

(51) Int. Cl.
*G06K 7/10* (2006.01)
(52) U.S. Cl.
CPC .................. *G06K 7/10475* (2013.01)
(58) Field of Classification Search
CPC ......... G06K 7/10475; H04W 52/0235; H04W 4/50; H04W 4/08; G06Q 10/063;
(Continued)

(56) References Cited

U.S. PATENT DOCUMENTS 10,031,575 B2 * 7/2018 Meng ........................ G06F 1/28
2010/0060434 A1 3/2010 Shiotsu et al.
(Continued)

FOREIGN PATENT DOCUMENTS

CN 101578062 A * 11/2009 ............. G06F 3/147
CN 101833683 9/2010
(Continued)

OTHER PUBLICATIONS

CN108924870A Application method and application system of electronic price tag, 9 pages. (Year: 2023).*
(Continued)

*Primary Examiner* — Tuyen K Vo
(74) *Attorney, Agent, or Firm* — Hanley, Flight & Zimmerman, LLC

(57) ABSTRACT

The present invention provides an electronic shelf label communication system, method and apparatus. The system comprises: a processor configured to send update data to a wireless access point corresponding to an electronic shelf label group where an electronic shelf label requiring data update is located; the wireless access point configured to send a group wakeup message to the electronic shelf label requiring data update, and send, after the electronic shelf label requiring data update wakes up according to each of countdown durations for receiving the update data, the unsent update data packages corresponding to the electronic shelf label to electronic shelf labels requiring data update in a same electronic shelf label group simultaneously, until all of the update data packages corresponding to the electronic shelf label are sent; and the electronic shelf label configured to wake up periodically, receive the group wakeup message and obtain the plurality of countdown durations for receiving the update data, and wake up again according to each of the countdown durations for receiving the update data, and (Continued)

receive the unreceived update data packages once, until all of the update data packages are received. The present invention has high efficiency and low power consumption.

14 Claims, 4 Drawing Sheets

(58) Field of Classification Search
CPC ......... G06Q 30/06; H04L 67/34; H04L 67/62; Y02D 30/70
See application file for complete search history.

(56) References Cited

U.S. PATENT DOCUMENTS

| | | | |
|---|---|---|---|
| 2011/0316676 | A1 | 12/2011 | Bajic et al. |
| 2014/0082147 | A1 | 3/2014 | Pazos et al. |
| 2014/0129393 | A1* | 5/2014 | Soon-Shiong ....... G06Q 10/087 705/27.2 |
| 2014/0177604 | A1* | 6/2014 | Lee ................... H04W 52/0229 370/336 |
| 2014/0353368 | A1* | 12/2014 | Connolly .......... H04W 52/0216 235/375 |
| 2015/0278890 | A1* | 10/2015 | Yang ..................... G06Q 30/00 705/26.1 |
| 2015/0348449 | A1* | 12/2015 | Choi .................. G06Q 30/0264 340/5.91 |
| 2015/0348450 | A1* | 12/2015 | Park ....................... G09F 3/208 340/5.91 |
| 2016/0049102 | A1 | 2/2016 | Lee et al. |

FOREIGN PATENT DOCUMENTS

| | | | | |
|---|---|---|---|---|
| CN | 105654155 | | 6/2016 | |
| CN | 106658689 | | 5/2017 | |
| CN | 108898203 | | 11/2018 | |
| CN | 108924870 | | 11/2018 | |
| CN | 108924870 | A * | 11/2018 | ............. G06Q 30/06 |
| CN | 109729550 | | 5/2019 | |
| CN | 109831753 | | 5/2019 | |
| EP | 2372619 | | 10/2011 | |
| EP | 2750096 | | 7/2014 | |
| JP | 2014130561 | A | 7/2014 | |
| JP | 2014183496 | | 9/2014 | |
| JP | 2015530057 | A | 10/2015 | |
| JP | 2018157345 | A | 10/2018 | |
| KR | 20160020265 | | 2/2016 | |

OTHER PUBLICATIONS

CN101578062A Electronic shelf label and electronic shelf label system, 15 pages. (Year: 2023).*
International Searching Authority, "International Search Report and Written Opinion," issued in connection with PCT Application No. PCT/CN2019/099891, with English Translation, dated Apr. 20, 2020, 8 pages.
IP Australia, "Examination Report No. 1 for Standard Patent Application", issued in connection with Australian Application No. 2019461859, dated Feb. 2, 2023, 3 pages.
China National Intellectual Property Administration, "First Notification of Office Action", issued in connection with Chinese Application No. 201910732826.X, dated May 6, 2022, 9 pages. [English Translation Included].
China National Intellectual Property Administration, "Search Report", issued in connection with Chinese Application No. 201910732826.X, dated Apr. 22, 2022, 5 pages. [English Translation Included].
China National Intellectual Property Administration, "Search Report", issued in connection with Chinese Application No. 201910732826.X, dated Oct. 9, 2022, 5 pages. [English Translation Included].
European Patent Office, "Extended European Search Report", issued in connection with European Application No. 19941392.3, dated Dec. 15, 2022, 8 pages.
Japan Patent Office, "Notice of Reasons for Refusal," issued in connection with Japanese Patent Application No. 2022-508583, dated Mar. 13, 2023, 8 pages (English translation included).
IP Australia, "Notice of acceptance for patent application", issued in connection with Australian Application No. 2019461859, dated Nov. 13, 2023, 3 pages.
State Intellectual Property Office of People's Republic of China, "Notification to Grant Patent Right for Invention", issued in connection with Chinese Application No. 201910732826.X, dated Jan. 13, 2023, 3 pages. [English Translation Included].
Japan Patent Office, "Decision to Grant a Patent," issued in connection with Japanese Patent Application No. 2022-508583, dated Aug. 2, 2023, 5 pages.
International Bureau, "International Preliminary Report on Patentability," issued in connection with International Patent Application No. PCT/CN2019/099891, dated Feb. 8, 2022, 8 pages. [English Translation Included].

* cited by examiner

401 — sending, upon receipt of electronic shelf label update data sent by a processor, a group wakeup message to an electronic shelf label requiring data update, wherein the group wakeup message comprises a plurality of countdown durations for receiving update data by the electronic shelf label requiring data update, and the update data comprises a plurality of update data packages;

402 — sending, after the electronic shelf label requiring data update wakes up according to each of the countdown durations for receiving the update data, the unsent update data packages corresponding to the electronic shelf label to electronic shelf labels requiring data update in a same electronic shelf label group simultaneously, until all of the update data packages corresponding to the electronic shelf label are sent.

FIG. 4

501 — waking up periodically, receiving a group wakeup message and obtain a plurality of countdown durations for receiving update data, wherein the update data comprises a plurality of update data packages;

502 — waking up again according to each of the countdown durations for receiving the update data, and receiving the unreceived update data packages once, until all of the update data packages are received.

FIG. 5

ELECTRONIC SHELF LABEL COMMUNICATION SYSTEM, METHOD AND APPARATUS

CROSS-REFERENCE TO RELATED APPLICATIONS

This application is a National Stage of International Application No. PCT/CN2019/099891, filed on Aug. 9, 2019, which is hereby incorporated by reference in its entirety.

TECHNICAL FIELD

The present disclosure relates to a technical field of electronic shelf labels, and particularly to an electronic shelf label communication system, method and apparatus.

BACKGROUND

Paper shelf labels are used in traditional supermarket. In recent years, many sales models combining online sales and offline sales are used in the supermarket to improve sales efficiency, so electronic shelf labels have occurred to replace the paper shelf labels. The existing electronic shelf label system communications in a wireless, wired or infrared mode. As the number of electronic shelf labels in large supermarkets is very large, it has become an urgent problem to improve the efficiency of communication between the electronic shelf label and the processor while achieving an excellent low power consumption effect.

SUMMARY

An embodiment of the present disclosure proposes an electronic shelf label communication system to realize communications between an electronic shelf label and a processor, with a high efficiency and a low power consumption, the system comprises:
  a processor, a plurality of wireless access points and a plurality of electronic shelf label groups, wherein
  each of the wireless access points is corresponding to the plurality of electronic shelf label groups, and each of the electronic shelf label groups comprises a plurality of electronic shelf labels;
  the processor is configured to send update data comprising a plurality of update data packages to the wireless access point corresponding to the electronic shelf label group where the electronic shelf label requiring data update is located;
  the wireless access point is configured to send, upon receipt of the update data sent by the processor, a group wakeup message to the electronic shelf label requiring data update, wherein the group wakeup message comprises a plurality of countdown durations for receiving the update data by the electronic shelf label requiring data update; and send, after the electronic shelf label requiring data update wakes up according to each of the countdown durations for receiving the update data, the unsent update data packages corresponding to the electronic shelf label to electronic shelf labels requiring data update in a same electronic shelf label group simultaneously, until all of the update data packages corresponding to the electronic shelf label are sent;
  the electronic shelf label is configured to wake up periodically, receive the group wakeup message and obtain the plurality of countdown durations for receiving the update data; and wake up again according to each of the countdown durations for receiving the update data, and receive the unreceived update data packages once, until all of the update data packages are received.

An embodiment of the present disclosure provides an electronic shelf label communication method to realize communications between an electronic shelf label and a processor, with high efficiency and low power consumption, the method comprises:
  sending, upon receipt of electronic shelf label update data sent by a processor, a group wakeup message to an electronic shelf label requiring data update, wherein the group wakeup message comprises a plurality of countdown durations for receiving update data by the electronic shelf label requiring data update, and the update data comprises a plurality of update data packages; and
  sending, after the electronic shelf label requiring data update wakes up according to each of the countdown durations for receiving the update data, the unsent update data packages corresponding to the electronic shelf label to electronic shelf labels requiring data update in a same electronic shelf label group simultaneously, until all of the update data packages corresponding to the electronic shelf label are sent.

An embodiment of the present disclosure provides an electronic shelf label communication method to realize communications between an electronic shelf label and a processor, with high efficiency and low power consumption, the method comprises:
  waking up periodically, receiving a group wakeup message and obtain a plurality of countdown durations for receiving update data, wherein the update data comprises a plurality of update data packages; and
  waking up again according to each of the countdown durations for receiving the update data, and receiving the unreceived update data packages once, until all of the update data packages are received.

An embodiment of the present disclosure provides an electronic shelf label communication apparatus to realize communications between an electronic shelf label and a processor, with high efficiency and low power consumption, the apparatus comprises:
  a group wakeup message sending module configured to send, upon receipt of electronic shelf label update data sent by a processor, a group wakeup message to an electronic shelf label requiring data update, wherein the group wakeup message comprises a plurality of countdown durations for receiving update data by the electronic shelf label requiring data update, and the update data comprises a plurality of update data packages; and
  an update data sending module configured to send, after the electronic shelf label requiring data update wakes up according to each of the countdown durations for receiving the update data, the unsent update data packages corresponding to the electronic shelf label to electronic shelf labels requiring data update in a same electronic shelf label group simultaneously, until all of the update data packages corresponding to the electronic shelf label are sent.

An embodiment of the present disclosure provides an electronic shelf label communication apparatus to realize communications between an electronic shelf label and a processor, with high efficiency and low power consumption, the apparatus comprises:
  a group wakeup message receiving module configured to wake up periodically, receive a group wakeup message and obtain a plurality of countdown durations for receiving update data, wherein the update data comprises a plurality of update data packages; and an update data receiving module configured to wake up again according to each of the countdown durations for receiving the update data, and receive the unreceived update data packages once until all of the update data packages are received.

An embodiment of the present disclosure provides a computer device comprising a memory, a processor, and a computer program stored in the memory and executable on the processor, wherein the processor is configured to execute the computer program to implement the aforementioned electronic shelf label communication method.

An embodiment of the present disclosure provides a computer-readable storage medium, storing a computer program for implementing the aforementioned electronic shelf label communication method.

In the embodiments of the present disclosure, the electronic shelf label wakes up periodically to receive the group wakeup message, and wakes up again according to each of the countdown durations for receiving the update data to receive unreceived update data packages once, until all of the update data packages are received, so that the power consumption of the electronic shelf label in an unawakened state is very low; after the electronic shelf label requiring data update wakes up according to each of the countdown durations for receiving the update data, the wireless access point simultaneously sends the unsent update data packages corresponding to the electronic shelf label to electronic shelf labels requiring data update in a same electronic shelf label group, until all of the update data packages corresponding to the electronic shelf label are sent, so that when the wireless access point simultaneously sends the update data packages to the electronic shelf labels requiring data update in the same electronic shelf label group, the adjacent update data packages, which are sent by the wireless access point, are sent to different electronic shelf labels, and there is a time interval, i.e., a countdown duration for receiving the update data, between different batches of update data packages of the same electronic shelf label, thereby providing the electronic shelf label with enough time to process the update data packages, and improving the communication efficiency of the plurality of electronic shelf label groups.

BRIEF DESCRIPTION OF DRAWINGS

The following drawings are used for a clear understanding of the present disclosure and constitute a part of the present disclosure, and shall not be construed as any limitation to the present disclosure. In the drawings:

FIG. 4 is a flowchart of an electronic shelf label communication method in an embodiment of the present disclosure;

FIG. 5 is a flowchart of another electronic shelf label communication method in an embodiment of the present disclosure;

DESCRIPTION OF EMBODIMENTS

For a clearer understanding of the objects, technical features and effects of this disclosure, specific embodiments will now be described with reference to the drawings. The described embodiments are intended only to schematically illustrate and explain this disclosure and do not limit the scope of this disclosure.

Figure 1:
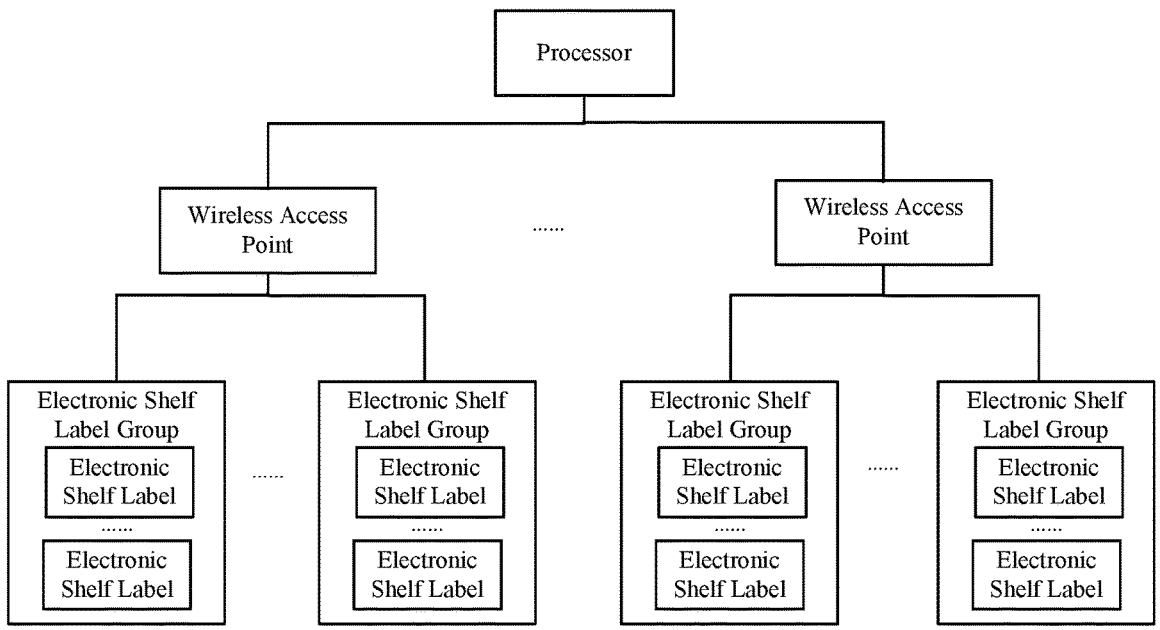
FIG. 1 is a schematic diagram of an electronic shelf label communication system in an embodiment of the present disclosure.

FIG. 1 is a schematic diagram of an electronic shelf label communication system in an embodiment of the present disclosure. As illustrated in FIG. 1, the system comprises:

a processor, a plurality of wireless access points and a plurality of electronic shelf label groups, wherein each of the wireless access points is corresponding to the plurality of electronic shelf label groups, and each of the electronic shelf label groups comprises a plurality of electronic shelf labels;

the processor is configured to send update data comprising a plurality of update data packages to the wireless access point corresponding to the electronic shelf label group where the electronic shelf label requiring data update is located;

the wireless access point is configured to:
send, upon receipt of the update data sent by the processor, a group wakeup message to the electronic shelf label requiring data update, wherein the group wakeup message comprises a plurality of countdown durations for receiving the update data by the electronic shelf label requiring data update; and send, after the electronic shelf label requiring data update wakes up according to each of the countdown durations for receiving the update data, the unsent update data packages corresponding to the electronic shelf label to the electronic shelf labels requiring data update in a same electronic shelf label group simultaneously, until all of the update data packages corresponding to the electronic shelf label are sent;

the electronic shelf label is configured to:
wake up periodically, receive the group wakeup message and obtain the plurality of countdown durations for receiving the update data; and wake up again according to each of the countdown durations for receiving the update data, and receive the unreceived update data packages once, until all of the update data packages are received.

In the embodiment of the present disclosure, the electronic shelf label wakes up periodically to receive the group wakeup message, and wakes up again according to each of the countdown durations for receiving the update data to receive the unreceived update data packages once, until all of the update data packages are received, so that the power consumption of the electronic shelf label in an unawakened state is very low. After the electronic shelf label requiring data update wakes up according to each of the countdown durations for receiving the update data, the wireless access point simultaneously sends the unsent update data packages corresponding to the electronic shelf label to electronic shelf labels requiring data update in a same electronic shelf label group, until all of the update data packages corresponding to the electronic shelf label are sent, so that when the wireless access point simultaneously sends the update data packages to the electronic shelf labels requiring data update in the same electronic shelf label group, the adjacent update data packages, which are sent by the wireless access point, are sent to different electronic shelf labels, and there is a time interval, i.e., a countdown duration for receiving the update data, between different batches of update data packages of the same electronic shelf label, thereby giving the electronic shelf label enough time to process the update data packages, and improving the communication efficiency of the plurality of electronic shelf label groups.

During implementation, the processor stores a corresponding relationship between each of the electronic shelf labels and a commodity in a supermarket. The processor also manages the plurality of wireless access points distributed in one or more supermarkets, including wireless channel information of the wireless access points, such as wireless operating frequencies and operation initiating commands. The processor generates content that a corresponding electronic shelf label should display according to data sent by a background ERP database of the supermarket to form update data of the electronic shelf label requiring data update, finds a wireless access point corresponding to an electronic shelf label group where the electronic shelf label is located, sends the update data to the wireless access point, and finally sends the data to the electronic shelf label by the wireless access point.

In order to reduce power consumption, the electronic shelf label is in an unawakened state by default, and can receive the group wakeup message after waking up. Upon receipt of the update data sent by the processor, the wireless access point sends the group wakeup message to the electronic shelf label requiring data update. Therefore, to make the electronic shelf label able to receive the group wakeup message, a duration of sending the group wakeup message by the wireless access point should cover the time interval between two times of waking up of the electronic shelf label to receive the group wakeup message. The group wakeup message includes a plurality of countdown durations for receiving the update data by the electronic shelf label requiring data update. Upon receipt of the group wakeup message, the electronic shelf label obtains a plurality of countdown durations for receiving the update data. The electronic shelf label counts down timing of each of the countdown durations for receiving the update data, and wakes up again according to each of the countdown durations for receiving the update data to receive the update data.

Since the electronic shelf labels require low power consumption, the Microcontroller Unit (MCU) used for each of the electronic shelf labels usually has a weak operational capability. If the wireless access point only communicates with one electronic shelf label each time and continuously sends the update data packages, the MCU with low power consumption will have no time to process these update data packages, so a group communication mode is adopted. The wireless access point can simultaneously communicate with a plurality of electronic shelf labels requiring data update, and the adjacent data packages are sent to different electronic shelf labels. After the electronic shelf label requiring data update wakes up according to each of the countdown durations for receiving the update data, the unsent update data packages corresponding to the electronic shelf label are sent to electronic shelf labels requiring data update in a same electronic shelf label group, until all of the update data packages corresponding to the electronic shelf label are sent, so that there is a time interval, i.e., a countdown duration for receiving the update data, between different batches of update data packages of the same electronic shelf label, thereby providing the electronic shelf label with enough time to process the update data packages, and improving the communication efficiency of the plurality of electronic shelf label groups, thus effectively considering the group communication efficiency and the low power consumption of each of the electronic shelf labels.

During implementation, since each of the electronic shelf label groups where the electronic shelf label is located is corresponding to a wireless access point, and the update data is transmitted between the processor and the electronic shelf label by the wireless access point, the communication between the wireless access points for the electronic shelf labels is very important, and it is necessary to ensure that each of the electronic shelf labels is corresponding to an optimal wireless access point.

In one embodiment, the electronic shelf label is further configured to send a heartbeat data package to the plurality of wireless access points after waking up periodically; the wireless access point is further configured to:
  receive the heartbeat data packages of the electronic shelf label, and obtain signal strength data when the heartbeat data package of the electronic shelf label is received; and
  send the signal strength data corresponding to the heartbeat data package of the electronic shelf label to the processor;
the processor is further configured to:
  receive the signal strength data corresponding to the heartbeat data packages of the plurality of electronic shelf labels sent by the plurality of wireless access points, and determine an optimal wireless access point corresponding to each electronic shelf label according to the received signal strength data; and
  network the electronic shelf label according to the optimal wireless access point, when the optimal wireless access point corresponding to the electronic shelf label is inconsistent with a current wireless access point.

In the above embodiment, after waking up periodically, the electronic shelf label actively sends the heartbeat data packages to the plurality of wireless access points, and the period may be 3 minutes or more. The specific process may be that the wireless access point turns on a heartbeat receiving function on a public wireless channel when the system is in a silent state; the electronic shelf label sends the heartbeat data package on the public channel, and the plurality of wireless access points will receive the heartbeat data package and obtain the signal strength data when the heartbeat data package of the electronic shelf label is received, and send the signal strength data corresponding to the heartbeat data package of the electronic shelf label to the processor; the processor receives the signal strength data corresponding to the heartbeat data package of the plurality of electronic shelf labels sent by the plurality of wireless access points, and determines an optimal wireless access point corresponding to each electronic shelf label according to the received signal strength data, i.e., determines a wireless access point used by the electronic shelf label to realize an optimization of data update, and when the optimal wireless access point corresponding to the electronic shelf label is inconsistent with a current wireless access point, networks the electronic shelf label according to the optimal wireless access point.

During implementation, there are a plurality of methods for the processor to network the electronic shelf labels according to the optimal wireless access point, and one embodiment will be given below.

In an embodiment, the step of networking the electronic shelf labels by the processor according to the optimal wireless access point comprises:

generating and sending wireless channel information to the optimal wireless access point, wherein the wireless channel information comprises an electronic shelf label identifier, and a set wireless channel instruction sent by the optimal wireless access point to the electronic shelf label corresponding to the electronic shelf label identifier; and modifying a group number of the electronic shelf label group where the electronic shelf label is located into a group number of one of the electronic shelf label groups corresponding to the optimal wireless access point.

In the above embodiment, after the optimal wireless access point sends the set wireless channel instruction to the electronic shelf label corresponding to the electronic shelf label identification, the corresponding electronic shelf label establishes a corresponding relationship between the optimal wireless access point and the electronic shelf label through the set wireless channel instruction. Through the set wireless channel instruction, the electronic shelf label wakes up again according to each of the countdown durations for receiving the update data to receive unreceived update data packages once. A group number of the electronic shelf label group where the electronic shelf label is located is modified into a group number of one of electronic shelf label groups corresponding to the optimal wireless access point. For example, a wireless access point A may correspond to electronic shelf label groups 1, 2, and 3. if an electronic shelf label is in an electronic shelf label group 4, and the optimal wireless access point determined by the above process is A, a group number of an electronic shelf label group where the electronic shelf label is located can be modified, i.e., a logical group number of the electronic shelf label is modified to 1, 2, or 3. Theoretically, all electronic shelf labels with a same logical group number are similar in physical locations, and probably may use a same wireless access point for communications. Thus, the group communication can reach the highest communication efficiency while considering low power consumption.

During implementation, the electronic shelf label may have various structures, and one embodiment will be given below.

In an embodiment, the electronic shelf label comprises a memory, a controller and a display, wherein, the memory is configured to store the update data; and the controller is configured to control the display to display data.

In the above embodiment, the display may be a graphic display with at least one display area. The graphic display may display price, name, place of origin and promotion information of a product by a dot matrix. Of course, the graphic display is only an example, and other forms of displays such as a dot matrix display may also be used, and related variations should fall within the scope of the present disclosure. The memory has a set of registers for storing update data. The structure of the electronic shelf label can enable the electronic shelf label to store as much data as possible and display the data as needed.

In an embodiment, the update data comprises an electronic shelf label identifier and at least one picture;

the processor is specifically configured to generate, according to attribute information of a commodity, at least one picture of the commodity; and generate the electronic shelf label identifier corresponding to the at least one picture of the commodity according to a binding relationship between the commodity and the electronic shelf label.

In the above embodiment, the processor sends the at least one picture of the commodity to the corresponding electronic shelf label by the wireless access point, after generating the at least one picture of the commodity. A binding relationship between the commodity and the electronic shelf label is stored in the processor and managed, e.g., modified, by the processor.

In one embodiment, the update data comprises electronic shelf label display control information;

the controller of the electronic shelf label is specifically configured to control the display of the electronic shelf label to display picture, upon receipt of the electronic shelf label display control information.

In the above embodiment, the electronic shelf label display control information may comprise an electronic shelf label identifier, a picture that the electronic shelf label should display, etc. The electronic shelf label display control information may not be simultaneously sent with the at least one picture. That is, the update data package received by one electronic shelf label does not include the electronic shelf label display control information in one data update, and the update data package includes the electronic shelf label display control information in the next data update. The picture that the electronic shelf label should display may be a serial number of the picture in the memory of the electronic shelf label, for example, an order of the picture among all pictures in the memory, or an identification number of the picture, which can be determined according to the actual situation.

Figure 2:
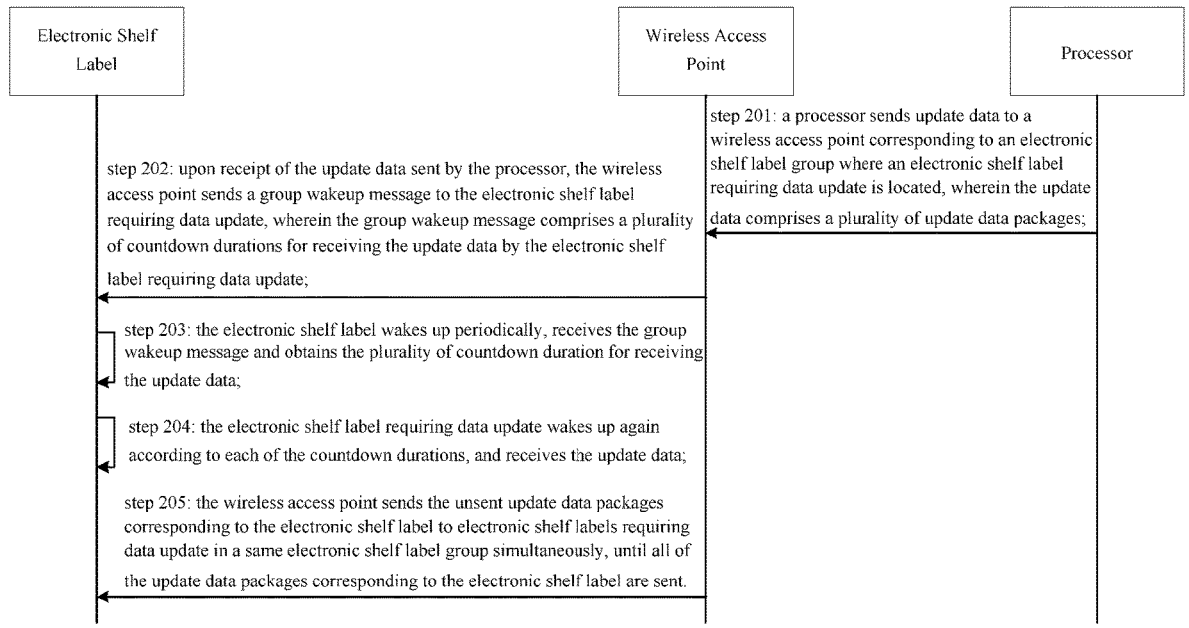
FIG. 2 is a detailed flowchart of updating data using an electronic shelf label communication system in an embodiment of the present disclosure.

Based on the above embodiments, an embodiment is given below to explain a detailed flow of updating data using an electronic shelf label communication system. FIG. 2 is a detailed flowchart of updating data using an electronic shelf label communication system in an embodiment of the present disclosure. As illustrated in FIG. 2, the flow comprises:

step 201: a processor sends update data to a wireless access point corresponding to an electronic shelf label group where an electronic shelf label requiring data update is located, wherein the update data comprises a plurality of update data packages;

step 202: upon receipt of the update data sent by the processor, the wireless access point sends a group wakeup message to the electronic shelf label requiring data update, wherein the group wakeup message comprises a plurality of countdown durations for receiving the update data by the electronic shelf label requiring data update;

step 203: the electronic shelf label wakes up periodically, receives the group wakeup message and obtains the plurality of countdown duration for receiving the update data;

step 204: the electronic shelf label requiring data update wakes up again according to each of the countdown durations, and receives the update data;

step 205: the wireless access point sends the unsent update data packages corresponding to the electronic shelf label to electronic shelf labels requiring data update in a same electronic shelf label group simultaneously, until all of the update data packages corresponding to the electronic shelf label are sent.

Of course, it can be understood that although a detailed process of updating data using an electronic shelf label communication system has been given above, any other process of a data update using an electronic shelf label communication system can also be derived according to the above embodiments, and relevant variations should fall within the scope of the present disclosure.

Figure 3:
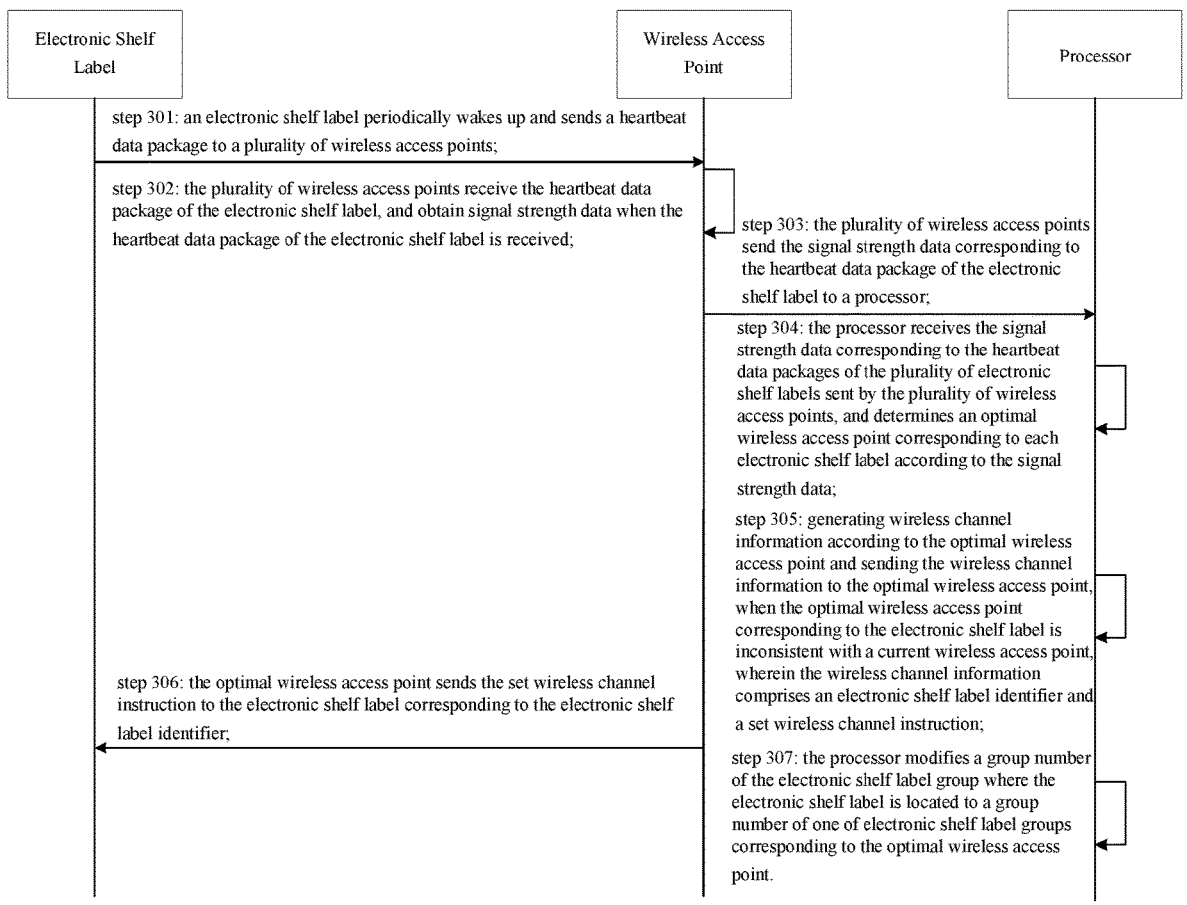
FIG. 3 is a detailed flowchart of determining an optimal wireless access point using an electronic shelf label communication system in an embodiment of the present disclosure.

Based on the above embodiments, an embodiment is given below to explain a detailed process of determining an optimal wireless access point using an electronic shelf label communication system. FIG. 3 is a detailed flowchart of determining an optimal wireless access point using an electronic shelf label communication system in an embodiment of the present disclosure. As illustrated in FIG. 3, the flow comprises:

- step 301: an electronic shelf label periodically wakes up and sends a heartbeat data package to a plurality of wireless access points;
- step 302: the plurality of wireless access points receive the heartbeat data package of the electronic shelf label, and obtain signal strength data when the heartbeat data package of the electronic shelf label is received;
- step 303: the plurality of wireless access points send the signal strength data corresponding to the heartbeat data package of the electronic shelf label to a processor;
- step 304: the processor receives the signal strength data corresponding to the heartbeat data packages of the plurality of electronic shelf labels sent by the plurality of wireless access points, and determines an optimal wireless access point corresponding to each electronic shelf label according to the signal strength data;
- step 305: generating wireless channel information according to the optimal wireless access point and sending the wireless channel information to the optimal wireless access point, when the optimal wireless access point corresponding to the electronic shelf label is inconsistent with a current wireless access point, wherein the wireless channel information comprises an electronic shelf label identifier and a set wireless channel instruction;
- step 306: the optimal wireless access point sends the set wireless channel instruction to the electronic shelf label corresponding to the electronic shelf label identifier;
- step 307: the processor modifies a group number of the electronic shelf label group where the electronic shelf label is located to a group number of one of electronic shelf label groups corresponding to the optimal wireless access point.

Of course, it can be understood that although a detailed process of a data update using an electronic shelf label communication system has been given above, any other process of a data update using an electronic shelf label communication system can also be derived according to the above embodiments, and relevant variations should fall within the scope of the present disclosure.

In the electronic shelf label communication system provided by the embodiments of the present disclosure, the electronic shelf label wakes up periodically to receive the group wakeup message; wakes up again according to each of the countdown durations for receiving the update data to receive the unreceived update data packages once, until all of the update data packages are received, so that the power consumption of the electronic shelf label in an unawakened state is very low. After the electronic shelf label requiring data update wakes up according to each of the countdown durations for receiving the update data, the wireless access point simultaneously sends the unsent update data packages corresponding to the electronic shelf label to electronic shelf labels requiring data update in a same electronic shelf label group, until all of the update data packages corresponding to the electronic shelf label are sent, so that there is a time interval, i.e., a countdown duration for receiving the update data, between different batches of sent update data packages of the same electronic shelf label, thereby proving the electronic shelf label with enough time to process the update data packages, and improving the communication efficiency of the plurality of electronic shelf label groups.

In addition, the processor determines, according to the signal strength data corresponding to the heartbeat data packages of the plurality of electronic shelf labels sent by the plurality of wireless access points, an optimal wireless access point corresponding to each electronic shelf labels and networks the electronic shelf label according to the optimal wireless access point, when the optimal wireless access point corresponding to the electronic shelf label is inconsistent with the current wireless access point. The electronic shelf label communication system can achieve the highest communication efficiency while giving considerations to the low power consumption.

The embodiments of the present disclosure further provide two electronic shelf label communication methods. Since the principle of technical solution of the electronic shelf label communication methods is similar to that of the electronic shelf label communication system, the repetitive description is omitted herein.

FIG. 4 is a flowchart of an electronic shelf label communication method in an embodiment of the present disclosure. As illustrated in FIG. 4, the method comprises:

- step 401: sending, upon receipt of electronic shelf label update data sent by a processor, a group wakeup message to an electronic shelf label requiring data update, wherein the group wakeup message comprises a plurality of countdown durations for receiving update data by the electronic shelf label requiring data update, and the update data comprises a plurality of update data packages; and
- step 402: sending, after the electronic shelf label requiring data update wakes up according to each of the countdown durations for receiving the update data, the unsent update data packages corresponding to the electronic shelf label to electronic shelf labels requiring data update in a same electronic shelf label group simultaneously, until all of the update data packages corresponding to the electronic shelf label are sent.

In step 401, a subject for implementing the method may be a wireless access point, which sends a group wakeup message to the electronic shelf label requiring data update upon receipt of the electronic shelf label update data sent by the processor. At this time, the electronic shelf label should be in an awake state. Therefore, to make the electronic shelf label able to receive the group wakeup message, a duration of sending the group wakeup message by the wireless access point should cover the time interval between two times of waking up of the electronic shelf label to receive the group wakeup message. The group wakeup message includes a plurality of countdown durations for receiving the update data by the electronic shelf label requiring data update, and the update data comprises a plurality of update data packages. In step 402, after the electronic shelf label requiring data update wakes up according to each of the countdown durations for receiving the update data, the wireless access point simultaneously sends the unsent update data packages corresponding to the electronic shelf label to electronic shelf labels requiring data update in a same electronic shelf label group, until all of the update data packages corresponding to the electronic shelf label are sent, so that there is a time interval, i.e., a countdown duration for receiving the update data, between different batches of update data packages of the same electronic shelf label, thereby giving the electronic shelf label enough time to process the update data packages, and improving the communication efficiency of the plurality of electronic shelf label groups, thus effectively considering the group communication efficiency and the low power consumption of each of the electronic shelf labels.

In one embodiment, the electronic shelf label communication method further comprises:

receiving a heartbeat data package of the electronic shelf label and obtaining signal strength data when the heartbeat data package of the electronic shelf label is received, wherein the heartbeat data package of the electronic shelf label is sent by the electronic shelf label when waking up periodically; and sending the signal strength data corresponding to the heartbeat data package of the electronic shelf label, wherein the signal strength data corresponding to the heartbeat data package is configured to determine an optimal wireless access point corresponding to the electronic shelf label.

In the above embodiment, a subject for implementing the method may be a wireless access point, and a process of determining an optimal wireless access point corresponding to the electronic shelf labels may be completed by any other device, such as a processor. The processor receives the signal strength data corresponding to the heartbeat data packages of the plurality of electronic shelf labels sent by the plurality of wireless access points, and determines an optimal wireless access point corresponding to each electronic shelf labels according to the received signal strength data; and networks the electronic shelf labels according to the optimal wireless access point, when the optimal wireless access point corresponding to the electronic shelf label is inconsistent with a current wireless access point.

In the electronic shelf label communication method provided by the embodiments of the present disclosure, after electronic shelf label update data sent by a processor is received, a group wakeup message is sent to an electronic shelf label requiring data update, wherein the group wakeup message comprises a plurality of countdown durations for receiving the update data by the electronic shelf label requiring data update, and the update data comprises a plurality of update data packages. In the above process, the electronic shelf label wakes up periodically to receive the group wakeup message, so that the power consumption of the electronic shelf label in an unawakened state is very low. Then, after the electronic shelf label requiring data update wakes up according to each of the countdown durations for receiving the update data, the unsent update data packages corresponding to the electronic shelf label are simultaneously sent to electronic shelf labels requiring data update in a same electronic shelf label group, until all of the update data packages corresponding to the electronic shelf label are sent, so that there is a time interval, i.e., a countdown duration for receiving the update data, between different batches of sent update data packages of the same electronic shelf label, thereby providing the electronic shelf label with enough time to process the update data packages, and improving the communication efficiency of the plurality of electronic shelf label groups.

In addition, the signal strength data corresponding to the heartbeat data package may be configured to determine an optimal wireless access point corresponding to the electronic shelf label, thereby achieving an optimal matching between the electronic shelf label and the wireless access point, so that the electronic shelf label communication system can achieve the highest communication efficiency while considering low power consumption.

FIG. 5 is a flowchart of another electronic shelf label communication method in an embodiment of the present disclosure. As illustrated in FIG. 5, the method comprises:

step 501: waking up periodically, receiving a group wakeup message and obtain a plurality of countdown durations for receiving update data, wherein the update data comprises a plurality of update data packages; and step 502: waking up again according to each of the countdown durations for receiving the update data, and receiving the unreceived update data packages once, until all of the update data packages are received.

In step 501, a subject for implementing the method may be an electronic shelf label, which is in an unawakened state by default, so that the power consumption of the electronic shelf label in the unawakened state is very low. If the electronic shelf label requires data update, then in step 502, the electronic shelf label wakes up according to each of the countdown durations for receiving the update data to receive the unreceived update data packages once, until all of the update data packages are received, so that there is a time interval, i.e., a countdown duration for receiving the update data, between different batches of update data packages of the same electronic shelf label, thereby providing the electronic shelf label with enough time to process the update data packages, and improving the communication efficiency of the plurality of electronic shelf label groups.

In one embodiment, the electronic shelf label communication method further comprises: sending a heartbeat data package to a plurality of wireless access points after waking up periodically, and obtaining signal strength data when the heartbeat data package is received by the wireless access points, wherein the signal strength data corresponding to the heartbeat data package is configured to determine an optimal wireless access points corresponding to the electronic shelf label.

In the above embodiment, a subject for implementing the method may be an electronic shelf label. The signal strength data corresponding to the heartbeat data package is finally sent to the processor by the wireless access point; the processor receives the signal strength data corresponding to the heartbeat data packages of the plurality of electronic shelf labels sent by the plurality of wireless access points, and determines an optimal wireless access point corresponding to each electronic shelf label according to the signal strength data, and when the optimal wireless access point corresponding to the electronic shelf label is inconsistent with a current wireless access point, networks the electronic shelf label according to the optimal wireless access point, thereby achieving an optimal matching between the electronic shelf label and the wireless access point, and achieving the highest communication efficiency while considering low power consumption.

In the electronic shelf label communication method provided by the embodiments of the present disclosure, the electronic shelf label is in an unawakened state by default, so that the power consumption of the electronic shelf label is very low. Then, the electronic shelf label wakes up periodically to receive a group wakeup message, and obtain a plurality of countdown durations for receiving update data, wherein the update data comprises a plurality of update data packages; and wakes up again according to each of the countdown durations for receiving the update data to receive the unreceived update data packages once, until all of the update data packages are received, so that there is a time interval, i.e., a countdown duration for receiving the update data, between different batches of update data packages of the same electronic shelf label, thereby providing the electronic shelf label with enough time to process the update data packages, and improving the communication efficiency of the plurality of electronic shelf label groups.

In addition, the signal strength data corresponding to the heartbeat data package may be configured to determine an optimal wireless access point corresponding to the electronic shelf label, so as to achieve the highest communication efficiency while considering low power consumption.

Based on the same inventive concept, the embodiments of the present disclosure further provide two electronic shelf label communication apparatuses as described in the following embodiments. Since the principle of technical solution of the electronic shelf label communication apparatus is similar to that of the electronic shelf label communication method, the method as described above may be referred to for implementation of the electronic shelf label communication apparatus, and the repetitive description is omitted herein.

Figure 6:
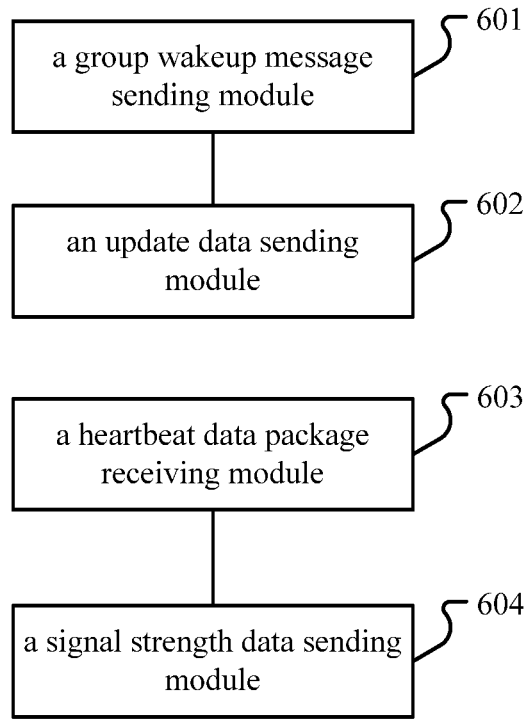
FIG. 6 is a schematic diagram of an electronic shelf label communication apparatus in an embodiment of the present disclosure.

FIG. 6 is a schematic diagram of an electronic shelf label communication apparatus in an embodiment of the present disclosure. As illustrated in FIG. 6, the apparatus comprises:

a group wakeup message sending module 601 configured to send, upon receipt of the electronic shelf label update data sent by a processor, a group wakeup message to an electronic shelf label requiring data update, wherein the group wakeup message comprises a plurality of countdown durations for receiving update data by the electronic shelf label requiring data update, and the update data comprises a plurality of update data packages; and an update data sending module 602 configured to send, after the electronic shelf label requiring data update wakes up according to each of the countdown durations for receiving the update data, the unsent update data packages corresponding to the electronic shelf label to electronic shelf labels requiring data update in a same electronic shelf label group simultaneously, until all of the update data packages corresponding to the electronic shelf label are sent.

In one embodiment, the electronic shelf label communication apparatus further comprises:

a heartbeat data package receiving module 603 configured to receive a heartbeat data package of the electronic shelf label and obtain signal strength data when the heartbeat data package of the electronic shelf label is received, wherein the heartbeat data package of the electronic shelf label is sent by the electronic shelf label when waking up periodically; and a signal strength data sending module 604 configured to send the signal strength data corresponding to the heartbeat data package of the electronic shelf label, wherein the signal strength data corresponding to the heartbeat data package is configured to determine an optimal wireless access point corresponding to the electronic shelf label.

In the electronic shelf label communication apparatus provided by the embodiments of the present disclosure, after electronic shelf label update data sent by a processor is received, a group wakeup message is sent to an electronic shelf label requiring data update, wherein the group wakeup message comprises a plurality of countdown durations for receiving the update data by the electronic shelf label requiring data update, and the update data comprises a plurality of update data packages. In the above process, the electronic shelf label wakes up periodically to receive the group wakeup message, so that the power consumption of the electronic shelf label in an unawakened state is very low. Then, after the electronic shelf label requiring data update wakes up according to each of the countdown durations for receiving the update data, the unsent update data packages corresponding to the electronic shelf label are simultaneously sent to electronic shelf labels requiring data update in a same electronic shelf label group, until all of the update data packages corresponding to the electronic shelf label are sent, so that there is a time interval, i.e., a countdown duration for receiving the update data, between different batches of sent update data packages of the same electronic shelf label, thereby providing the electronic shelf label with enough time to process the update data packages, and improving the communication efficiency of the plurality of electronic shelf label groups.

In addition, the signal strength data corresponding to the heartbeat data package may be configured to determine an optimal wireless access point corresponding to the electronic shelf label, thereby achieving an optimal matching between the electronic shelf label and the wireless access point, so that the electronic shelf label communication system can achieve the highest communication efficiency while considering low power consumption.

Figure 7:
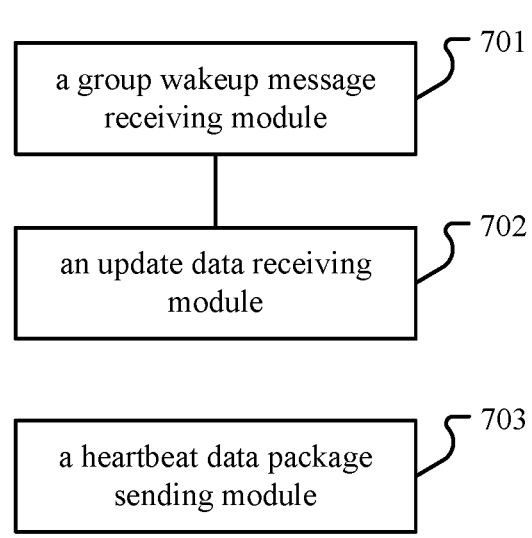
FIG. 7 is a schematic diagram of another electronic shelf label communication apparatus in an embodiment of the present disclosure.

FIG. 7 is a schematic diagram of another electronic shelf label communication apparatus in an embodiment of the present disclosure. As illustrated in FIG. 7, the apparatus comprises:

a group wakeup message receiving module 701 configured to wake up periodically, receive a group wakeup message; and obtain a plurality of countdown durations for receiving update data, wherein the update data comprises a plurality of update data packages; and an update data receiving module 702 configured to wake up again according to each of the countdown durations for receiving the update data, and receive the unreceived update data packages once, until all of the update data packages are received.

In one embodiment, electronic shelf label communication apparatus further comprises: a heartbeat data package sending module 703 configured to send a heartbeat data package to a plurality of wireless access points after waking up periodically, and obtain signal strength data when the heartbeat data package is received by the wireless access points, wherein the signal strength data corresponding to the heartbeat data package is configured to determine an optimal wireless access point corresponding to electronic shelf label.

In the electronic shelf label communication apparatus provided by the embodiments of the present disclosure, the electronic shelf label is in an unawakened state by default, so that the power consumption of the electronic shelf label is very low. Then, the electronic shelf label wakes up periodically to receive a group wakeup message, and obtain a plurality of countdown durations for receiving update data, wherein the update data comprises a plurality of update data packages; and wakes up again according to each of the countdown durations for receiving the update data to receive unreceived update data packages once, until all of the update data packages are received, so that there is a time interval, i.e., a countdown duration for receiving the update data, between different batches of update data packages of the same electronic shelf label, thereby providing the electronic shelf label with enough time to process the update data packages, and improving the communication efficiency of the plurality of electronic shelf label groups.

In addition, the signal strength data corresponding to the heartbeat data package may be configured to determine an optimal wireless access point corresponding to the electronic shelf label, so as to achieve the highest communication efficiency while considering low power consumption.

Those skilled in the art should understand that the embodiments of this disclosure can be provided as methods, systems or computer program products. Therefore, this disclosure may be implemented in the form of fully-hardware embodiments, fully-software embodiments, or combined software-hardware embodiments. In addition, this disclosure may employ the form of a computer program product implemented on one or more computer storage medium (including but not limited to disk memory, CD-ROM, and optical memory) containing computer programming code.

This disclosure is set forth by referring to flow charts and/or block diagrams for the methods, devices (systems), and computer program products of the embodiments. It should be understood that each process and/or block of the flow charts and/or block diagrams as well as combinations of the processes and/or boxes of the flow charts and/or block diagrams can be realized by computer program instructions. These computer program instructions can be provided to general-purpose computers, special-purpose computers, embedded processors or the processors of other programmable data processing devices to produce a machine, so that an apparatus for implementing the functions designated in one or more processes of the flowcharts and/or one or more blocks of the block diagrams can be produced by the instructions executed by the processor of the computer or other programmable data processing device.

These computer program instructions can also be stored in a computer-readable storage medium which can guide a computer or other programmable data processing device to operate in a particular way, so that an article of manufacture comprising an instruction apparatus can be produced by the instructions stored in the storage medium, with the instruction apparatus implementing the functions designated in one or more processes of the flowcharts and/or one or more blocks of the block diagram.

These computer program instructions may also be loaded onto a computer or other programmable data processing device to make the computer or other programmable data processing device perform a sequence of computer-implemented operations, so that the instructions executed by the computer or other programmable data processing device realize one or more processes of the flowcharts and/or one or more blocks of the block diagram.

The purpose, technical features and technical effects of the present disclosure have been further described above by means of some embodiments. It should be understood that the embodiments are meant to facilitate understanding of the principles of the present disclosure, and those skilled in the art can make any modifications based on the teachings of this disclosure. This specification shall not be construed as any limitation to the present disclosure.

The invention claimed is:

1. An electronic shelf label communication system, comprising:
   a processor;
   a plurality of wireless access points; and
   a plurality of electronic shelf label groups, wherein each of the wireless access points is corresponding to the plurality of electronic shelf label groups, and each of the electronic shelf label groups comprises a plurality of electronic shelf labels;
   wherein the processor is configured to send update data comprising a plurality of update data packages to the wireless access point corresponding to the electronic shelf label group where the electronic shelf label requiring data update is located;
   wherein the wireless access point is configured to:
      send, upon receipt of the update data sent by the processor, a group wakeup message to the electronic shelf label requiring data update, wherein the group wakeup message comprises a plurality of countdown durations for receiving the update data by the electronic shelf label requiring data update; and
      send, after the electronic shelf label requiring data update wakes up according to each of the countdown durations for receiving the update data, the unsent update data packages corresponding to the electronic shelf label to the electronic shelf labels requiring data update in a same electronic shelf label group simultaneously, until all of the update data packages corresponding to the electronic shelf label are sent, wherein adjacent update data packages, which are sent by the wireless access point, are sent to different electronic shelf labels, and there is a countdown duration for receiving the update data between different batches of update data packages of the same electronic shelf label.

2. The electronic shelf label communication system according to claim 1, wherein the electronic shelf label is further configured to send a heartbeat data package to the plurality of wireless access points after waking up periodically;
   the wireless access point is further configured to:
      receive the heartbeat data packages of the electronic shelf label and obtain signal strength data when the heartbeat data package of the electronic shelf label is received; and
      send the signal strength data corresponding to the heartbeat data package of the electronic shelf label to the processor;
   the processor is further configured to:
      receive the signal strength data corresponding to the heartbeat data packages of the plurality of electronic shelf labels sent by the plurality of wireless access points, and determine an optimal wireless access point corresponding to each electronic shelf label according to the signal strength data; and
      network the electronic shelf label according to the optimal wireless access point, when the optimal wireless access point corresponding to the electronic shelf label is inconsistent with a current wireless access point.

3. The electronic shelf label communication system according to claim 2, wherein the step of networking the electronic shelf labels by the processor according to the optimal wireless access point comprises:
   generating and sending wireless channel information to the optimal wireless access point, wherein the wireless channel information comprises an electronic shelf label identifier, and a set wireless channel instruction sent by the optimal wireless access point to the electronic shelf label corresponding to the electronic shelf label identifier; and
   modifying a group number of the electronic shelf label group where the electronic shelf label is located into a group number of one of the electronic shelf label groups corresponding to the optimal wireless access point.

4. The electronic shelf label communication system according to claim 1, wherein the electronic shelf label comprises a memory, a controller and a display, wherein the memory is configured to store the update data; and the controller is configured to control the display to display data.

5. The electronic shelf label communication system according to claim 4, wherein the update data comprises an electronic shelf label identifier and at least one picture;

the processor is specifically configured to:

generate, according to attribute information of a commodity, the at least one picture of the commodity; and generate the electronic shelf label identifier corresponding to the at least one picture of the commodity according to a binding relationship between the commodity and the electronic shelf label.

6. The electronic shelf label communication system according to claim 5, wherein the update data comprises electronic shelf label display control information;

the controller of the electronic shelf label is specifically configured to control the display of the electronic shelf label to display picture, upon receipt of the electronic shelf label display control information.

7. An electronic shelf label communication method, comprising:

sending, upon receipt of electronic shelf label update data sent by a processor, a group wakeup message to an electronic shelf label requiring data update, wherein the group wakeup message comprises a plurality of countdown durations for receiving update data by the electronic shelf label requiring data update, and the update data comprises a plurality of update data packages; and sending, after the electronic shelf label requiring data update wakes up according to each of the countdown durations for receiving the update data, the unsent update data packages corresponding to the electronic shelf label to electronic shelf labels requiring data update in a same electronic shelf label group simultaneously, until all of the update data packages corresponding to the electronic shelf label are sent, wherein adjacent update data packages, which are sent by a wireless access point, are sent to different electronic shelf labels, and there is a countdown duration for receiving the update data between different batches of update data packages of the same electronic shelf label.

8. The electronic shelf label communication method according to claim 7, further comprising:

receiving a heartbeat data package of the electronic shelf label and obtaining signal strength data when the heartbeat data package of the electronic shelf label is received, wherein the heartbeat data package of the electronic shelf label is sent by the electronic shelf label when waking up periodically; and sending the signal strength data corresponding to the heartbeat data package of the electronic shelf label, wherein the signal strength data corresponding to the heartbeat data package is configured to determine an optimal wireless access point corresponding to the electronic shelf label.

9. The electronic shelf label communication method according to claim 7, further comprising:

waking up periodically, receiving a group wakeup message and obtain a plurality of countdown durations for receiving update data, wherein the update data comprises a plurality of update data packages; and waking up again according to each of the countdown durations for receiving the update data, and receiving the unreceived update data packages once, until all of the update data packages are received.

10. The electronic shelf label communication method according to claim 9, further comprising:

sending a heartbeat data package to a plurality of wireless access points after waking up periodically, and obtaining signal strength data when the heartbeat data package is received by the wireless access points, wherein the signal strength data corresponding to the heartbeat data package is configured to determine an optimal wireless access point corresponding to the electronic shelf label.

11. An electronic shelf label communication apparatus, comprising:

at least one memory;

machine readable instructions; and programmable circuitry to at least one of instantiate or execute the machine readable instructions to:

send, upon receipt of electronic shelf label update data sent by a processor, a group wakeup message to an electronic shelf label requiring data upate, wherein the group wakeup message comprises a plurality of countdown durations for receiving update data by the electronic shelf label requiring data update, and the upate data comprises a plurality of update data packages; and send, after the electronic shelf label requiring data update wakes up according to each of the countdown durations for receiving the updata data, unsent update data packages corresponding to the electronic shelf label to electronic shelf labels requiring data update in a same electronic shelf label group simultaneously, until all of the updata data packages corresponding to the electronic shelf label are sent, wherein adjacent updata data packages, which are sent by the updata data sending module, are sent to different electronic shelf labels, and there is a countdown duration for receiving the updata data between different batches of updata data packages of the same electronic shelf label.

12. The electronic shelf label communication apparatus according to claim 11, wherein the programmable circuitry is to:

receive a heartbeat data package of the electronic shelf label and obtain signal strength data when the heartbeat data package of the electronic shelf label is received, wherein the heartbeat data package of the electronic shelf label is sent by the electronic shelf label when waking up periodically; and send the signal strenth data corresponding to the heartbeat data package of the electronic shelf lable, wherein the signal strenth data corresponding to the heartbeat data package is configured to determine an optimal wireless access point corresponding to the electronic shelf label.

13. The electronic shelf label communication apparatus according to claim 11, wherein the programmable circuitry is to:

perform a periodic wakeup up, receive a group wakeup message and obtain a plurality of countdown durations for receiving update data, wherein the update data comprises a plurality of update data packages; and perform another wake up according to each of the countdown durations for receiving the update data, and receive the unreceived update data packages once until all of the update data packages are received.

14. The electronic shelf label communication apparatus according to claim 13, wherein the programmable circuitry is:

send a heartbeat data package to a plurality of wireless access points after waking up periodically, and obtain signal strength data when the heartbeat data package is received by the wireless access points, wherein the signal strength data corresponding to the heartbeat data package is configured to determine an optimal wireless access point corresponding to electronic shelf label.

* * * * *